(12) United States Patent
Imachi et al.

(10) Patent No.: US 6,536,920 B2
(45) Date of Patent: Mar. 25, 2003

(54) VEHICLE HEADLAMP

(75) Inventors: Tetsumasa Imachi, Shizuoka (JP); Masahiro Masuda, Shizuoka (JP); Tutomu Naito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/998,473

(22) Filed: Nov. 29, 2001

(65) Prior Publication Data
US 2002/0067617 A1 Jun. 6, 2002

(30) Foreign Application Priority Data
Dec. 6, 2000 (JP) ......................... 2000-371206

(51) Int. Cl.[7] ................................. B60Q 1/04
(52) U.S. Cl. ................ 362/265; 362/507; 362/263
(58) Field of Search ................. 362/263, 265, 362/507, 538

(56) References Cited
U.S. PATENT DOCUMENTS

| | | | | |
|---|---|---|---|---|
| 4,513,357 A | * | 4/1985 | Nieda et al. .................. 362/544 |
| 5,188,444 A | * | 2/1993 | Makita et al. ................ 362/519 |
| 5,895,113 A | * | 4/1999 | Ozaki et al. .................. 362/546 |
| 6,161,951 A | | 12/2000 | Yoneyama et al. | |

* cited by examiner

Primary Examiner—Sandra O'Shea
Assistant Examiner—Hargobind S. Sawhney
(74) Attorney, Agent, or Firm—Koda & Androlia

(57) ABSTRACT

A vehicle headlamp including a lamp body, a front cover that covers the front of the lamp body, a reflector disposed in the lamp body, a discharge bulb supported by the reflector, a lighting circuit assembly formed by housing a ballast circuit for lighting the discharge bulb and a starting circuit in a casing, and a power feeding connector connected to the lighting circuit assembly by a cord and removably coupled to the connector portion of the discharge bulb. A lighting circuit case that houses the lighting circuit assembly is integrally disposed on the lamp body with a connecting portion in between, the lighting circuit case is provided on the side of the lamp body, and the connecting portion is in a shape of a lateral U in vertical cross-section so as to allow the power feeding connector to pass through.

2 Claims, 6 Drawing Sheets

VEHICLE HEADLAMP

BACKGROUND OF THE INVENTION

1. Field of the Invention

The present invention relates to a vehicle headlamp and more particularly to a vehicle headlamp that uses a discharge bulb as a light source and has a lighting circuit.

2. Prior Art

One type of vehicle headlamp uses a discharge bulb as a light source.

Such a vehicular headlamp requires a ballast circuit and a starting circuit so as to light the discharge bulb. The ballast circuit increases the voltage of a battery installed in the vehicle and converts the battery voltage to a corresponding AC voltage and applies it to the discharge bulb. The starting circuit applies a high starting voltage required for the start of lighting. Generally, the ballast circuit and the starting circuit are installed in a casing, thus forming a lighting circuit assembly; and this lighting circuit assembly is integrally mounted on the headlamp.

FIG. 6 shows one example of this headlamp. A reflector c is provided in a space defined by a lamp body a and a front cover b that covers the front opening of the lamp body a. The reflector c holds a discharge bulb d. A disposition recess g for housing a lighting circuit assembly f is provided at the bottom of the lamp body a, and the lighting circuit assembly f is installed in the disposition recess g. A power feeding connector i connected to the lighting circuit assembly f by a cord h is connected to a connector portion (not shown) of the discharge bulb d.

In some cases, however, a lamp body has no space for the lighting circuit assembly in the bottom. In this case, the lighting circuit assembly is disposed on the outer side surface of the lamp body. If the lighting circuit assembly f is disposed in the bottom of the lamp body a as shown in FIG. 6, the disposition recess g is formed by way of slightly protruding the bottom wall of the lamp body a downward. Therefore, there is no problem with the strength required for supporting the heavy lighting circuit assembly f. However, if the lighting circuit case for housing the lighting circuit assembly needs to be disposed on the side of the lamp body, the lighting circuit case and the side or the rear portion of the lamp body are connected by some form of connection means. As a result, the strength of the connection means becomes the issue.

When the discharge bulb or the lighting circuit assembly is need to be replaced, it is necessary to remove the power feeding connector from the discharge bulb or remove the lighting circuit assembly from the lamp body. In such cases, it is necessary to avoid the power feeding connector and the cord that connects the power feeding connector to the lighting circuit assembly from being caught between the reflector and the lamp body. As a result, a passage for the power feeding connector and the cord is required between a discharge bulb-supporting portion of the reflector and the lighting circuit case. Generally, the lighting circuit assembly, the cord, and the power feeding connector are formed integrally, and they are structured in a mutually inseparable fashion so as to ensure the safety. As a result, when the lighting circuit assembly is to be removed from the lamp body, it is necessary to pull out the power feeding connector. In such a case, chances are that the power feeding connector is caught between the reflector and the lamp body.

SUMMARY OF THE INVENTION

Accordingly, it is an object of the present invention to provide a vehicular lamp that supports a lighting circuit assembly on a side of a lamp body without presenting any problem with strength.

Another object of the present invention is to provide a vehicular lamp that has a passage for a power feeding connector and a cord that connects the power feeding connector to a lighting circuit assembly.

The above objects are accomplished by a unique structure for a vehicle headlamp that comprises: a lamp body, a front cover that covers the front opening of the lamp body, a reflector disposed in a space defined by the lamp body and the front cover, a discharge bulb supported by the reflector, a lighting circuit assembly that includes in a casing a ballast circuit for lighting the discharge bulb and a starting circuit; and in the present invention, a lighting circuit case that houses the lighting circuit assembly is integrally disposed on the lamp body with a connecting portion in between and is provided on the side of the lamp body; and the connecting portion is in a shape of a lateral U in vertical cross-section so as to allow the power feeding connector to pass through.

In the vehicle headlamp according to the present invention, the connecting portion that integrally connects the lighting circuit case to the lamp body has nearly a lateral U-shape in vertical cross section. Accordingly, the connecting portion has a great strength due to its shape. Thus, when a heavy lighting circuit assembly is housed in the lighting circuit case, the weight is sufficiently supported, and the connecting portion is prevented from being changed its shape.

In addition, the connecting portion is of a lateral U-shape in vertical cross section. As a result, a sufficient space is obtained in the connecting portion, and the connecting portion functions as a passage for the power feeding connector. When the lighting circuit assembly is removed from the lamp body, the power feeding connector will not be caught between the reflector and the lamp body.

DETAILED DESCRIPTION OF THE INVENTION

Embodiments of the vehicle headlamp according to the present invention will be described with reference to the accompanying drawings.

Figure 1:
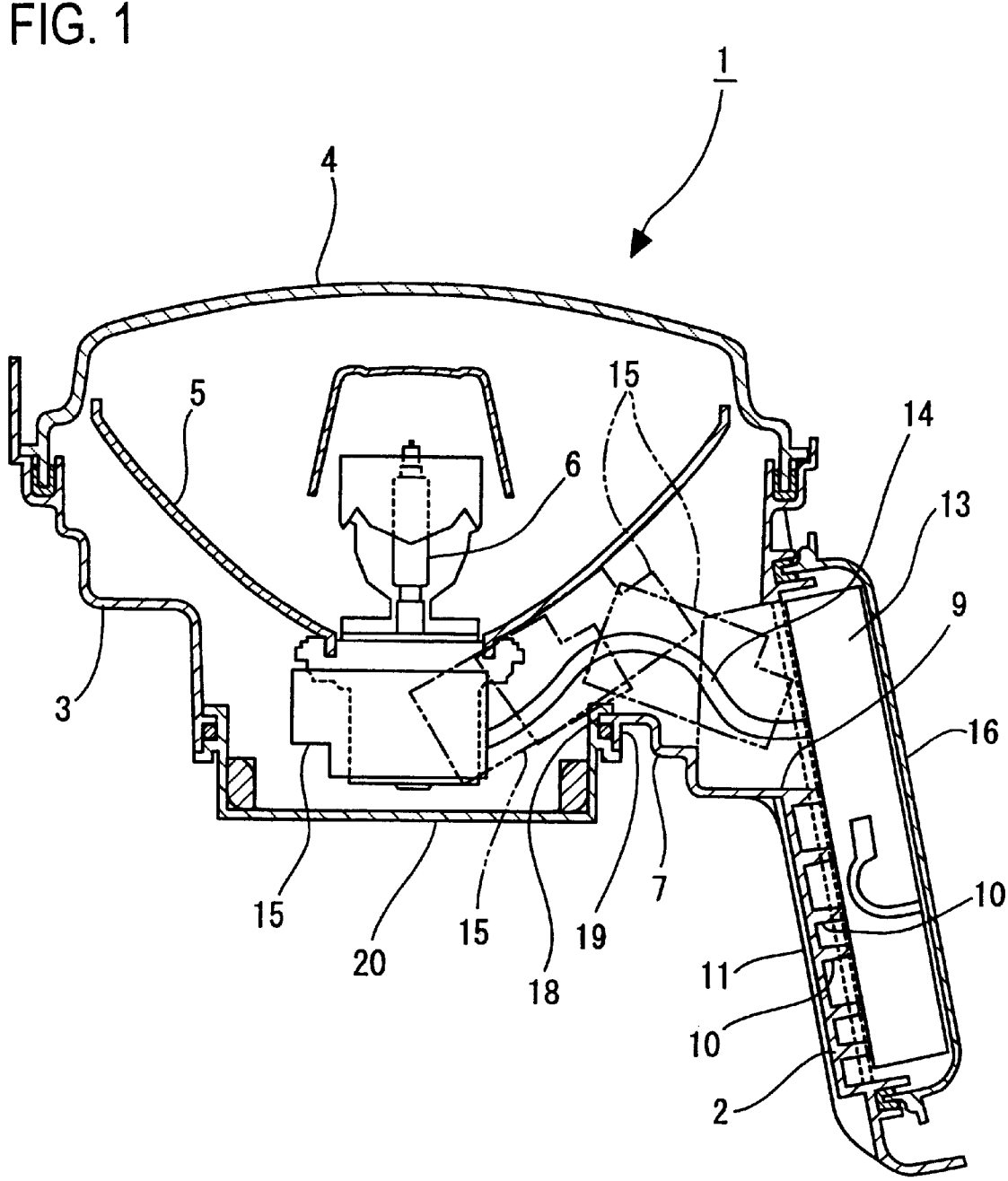
FIG. 1 shows in a horizontal section the vehicle headlamp according to one embodiment of the present invention.

As seen from FIG. 1, a vehicle headlamp 1 includes a lamp body 3. The lamp body 3 is made of synthetic resin, opens at its front, and is formed integrally with a lighting circuit case 2 on one side thereof. The front opening of the lamp body 3 is covered with a transparent front cover 4, and a reflector 5 is tiltably installed in the space that is defined by the lamp body 3 and the front cover 4. A discharge bulb 6 is detachably installed at the center of the rear portion of the reflector 5.

The lighting circuit case 2 is formed so as to extend rearward on one side (or on the right side in FIG. 1) of the lamp body 3. The lighting circuit case 2 is a shallow container that opens toward the left side direction. The lighting circuit case 2 is, at its front end portion, integrally connected to the lamp body 3 with a connecting portion 7 in between. The connecting portion 7 has a shape that protrudes rearward. In other words, the connecting portion 7 has, as best seen from FIG. 3, nearly a lateral U shape in a vertical cross section so that it opens frontward (left side in FIG. 3). The size of the inside of the connecting portion 7 is at least larger than the size of the power feeding connector 15. Thus, the connecting portion 7 can serve as a passage that communicatively connects the lighting circuit case 2 to the lamp body 3.

Figure 2:
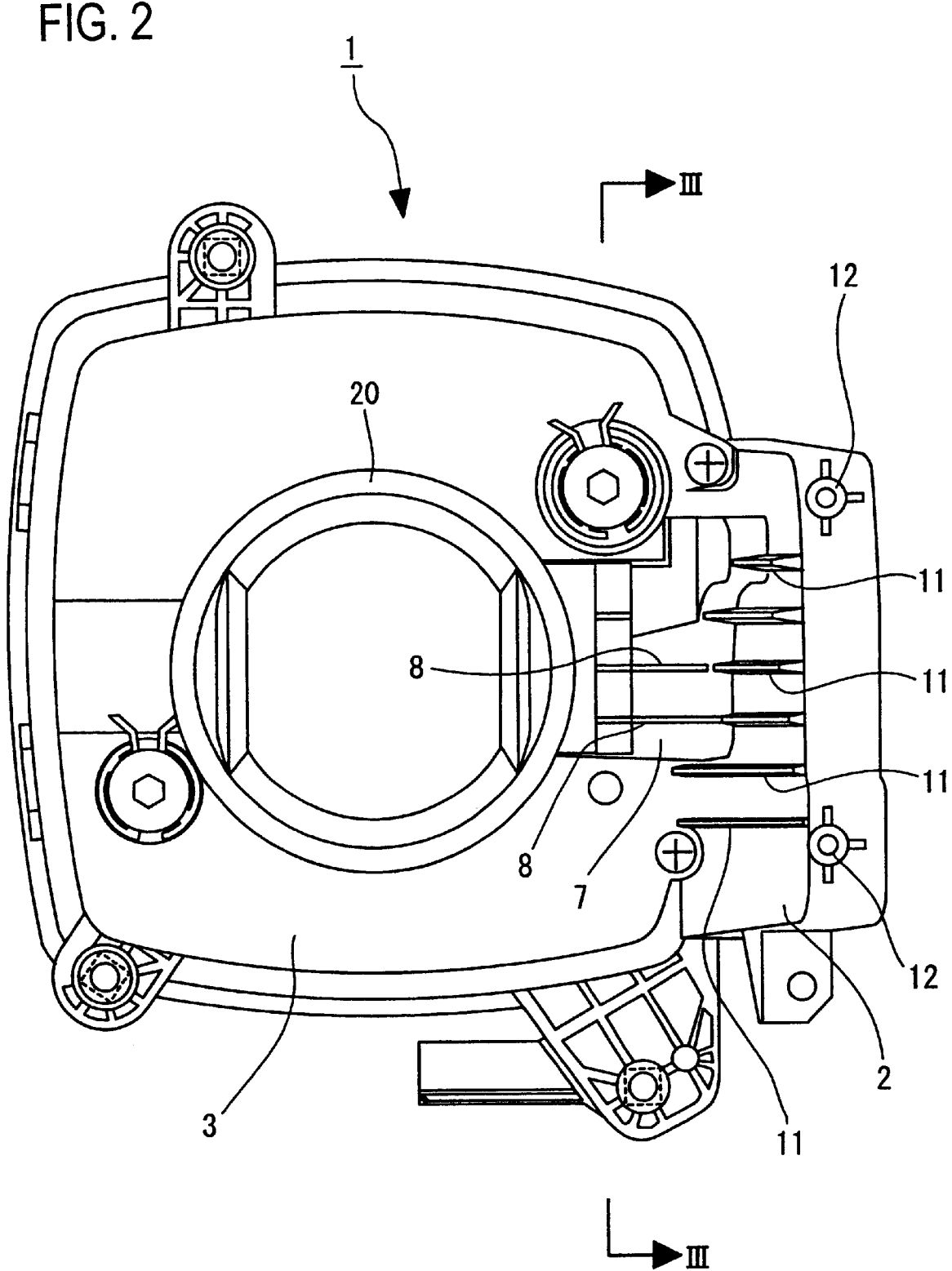
FIG. 2 is a rear elevational view thereof.
Figure 3:
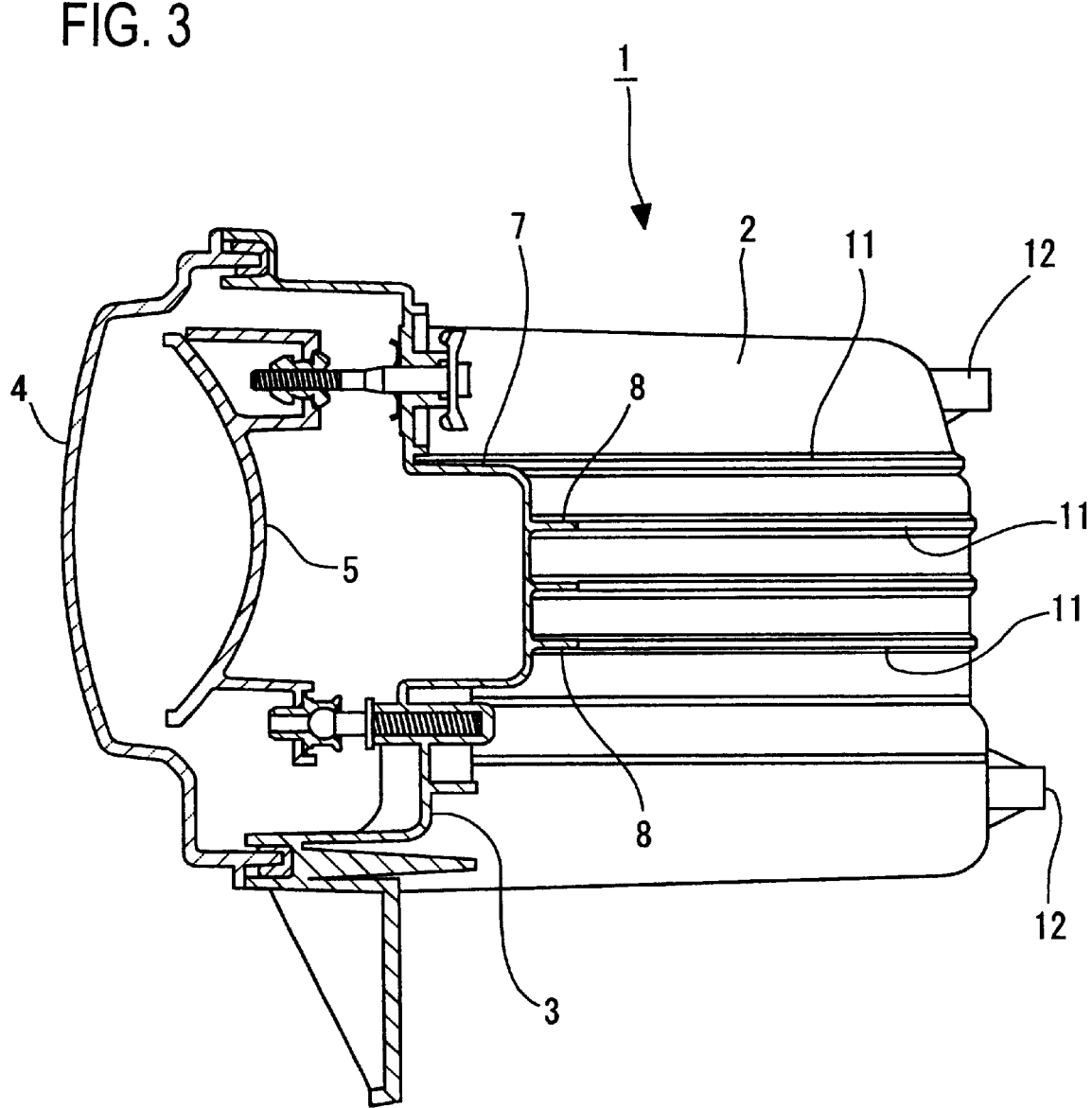
FIG. 3 is a sectional view taken along the line III—III of FIG. 2.
Figure 4:
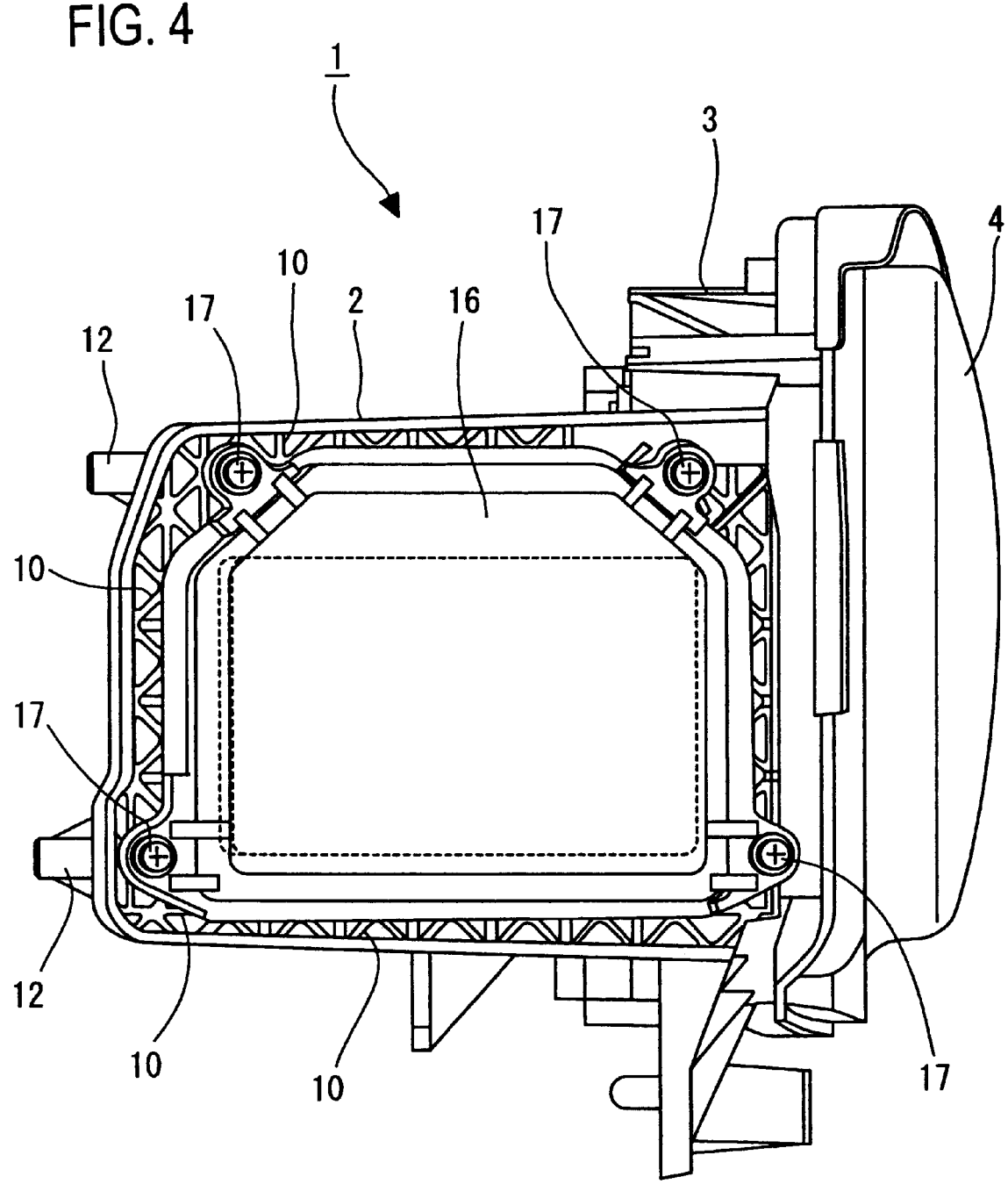
FIG. 4 is a right side view thereof.
Figure 5:
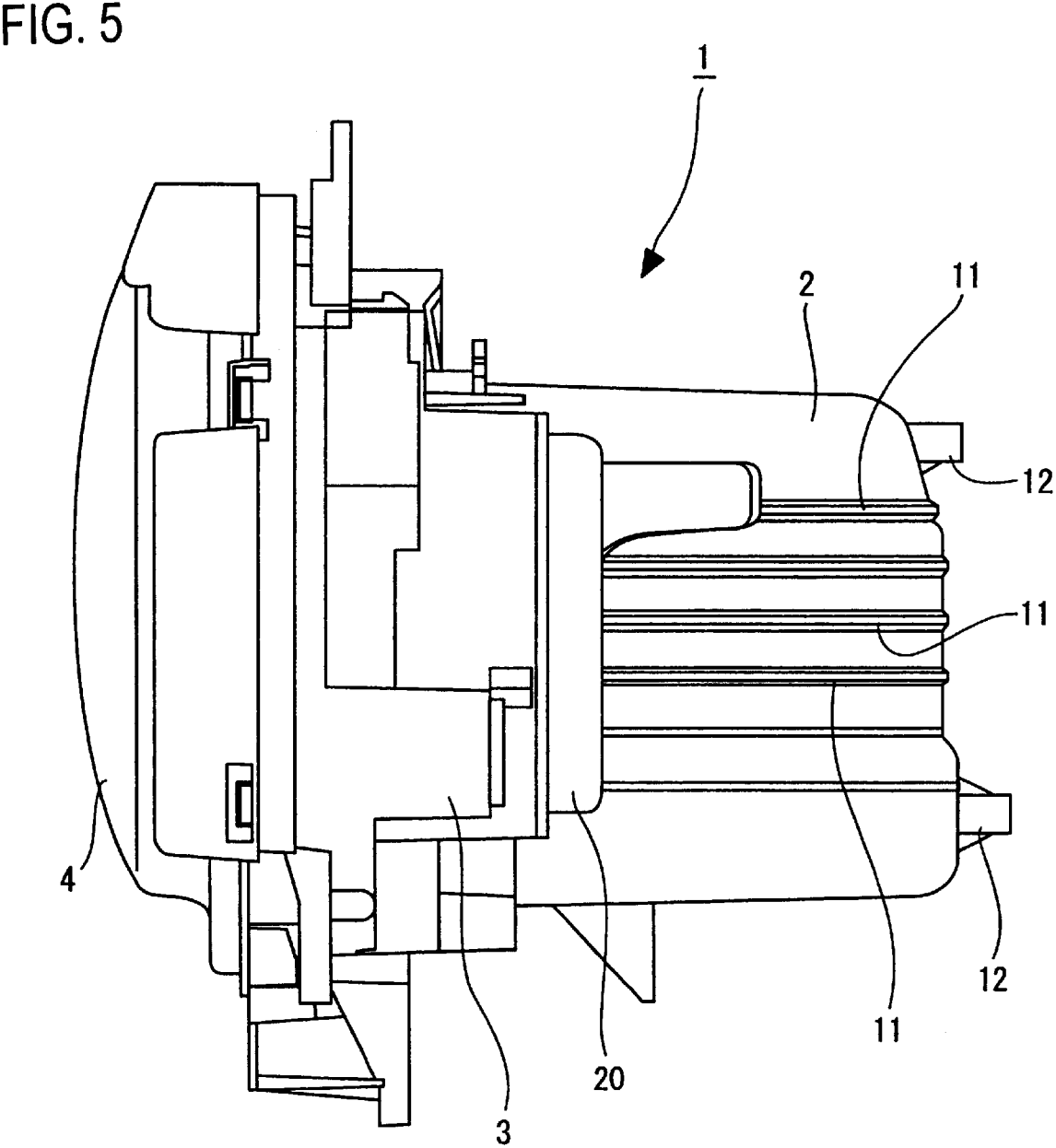
FIG. 5 is a left side view thereof.
Figure 6:
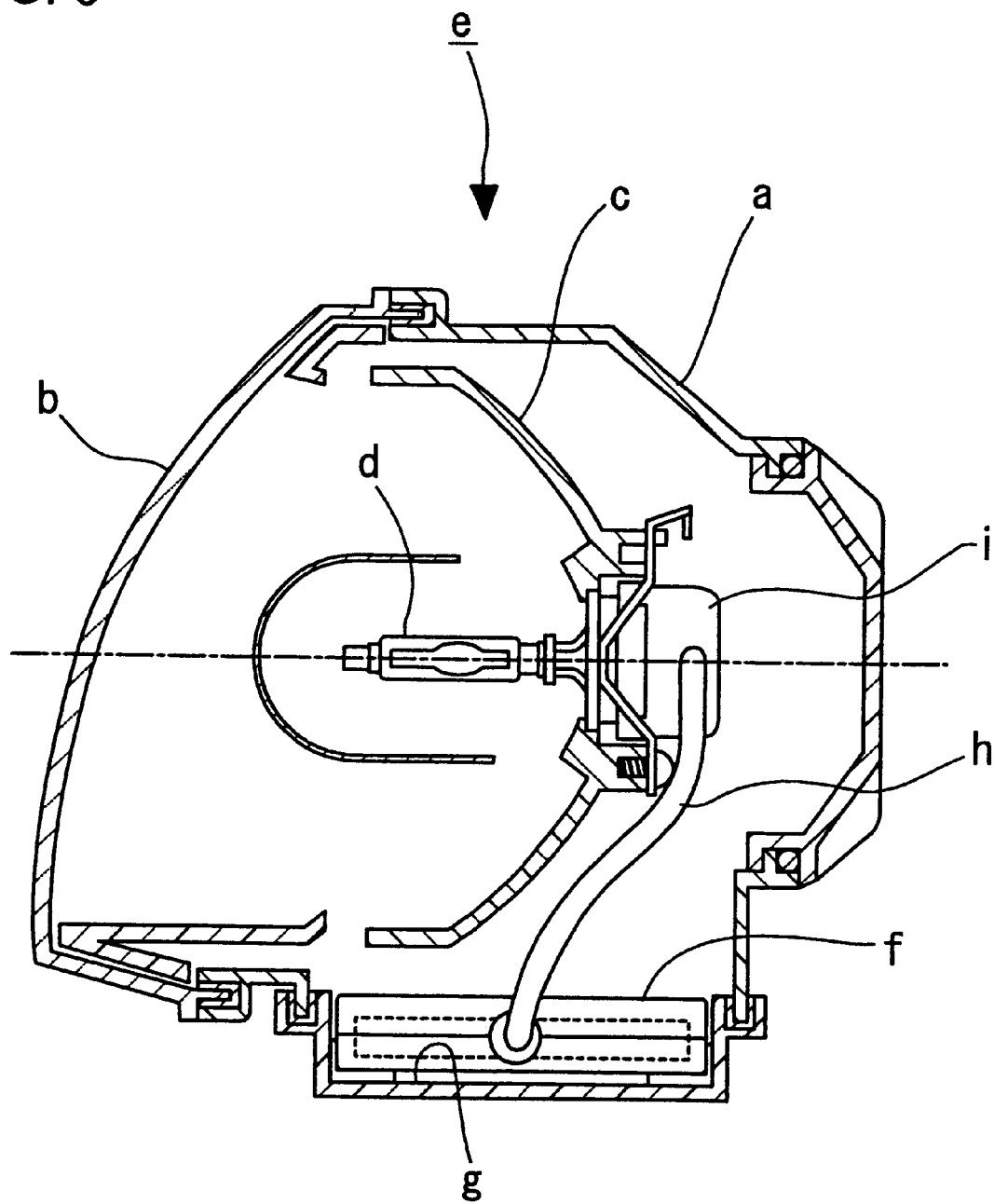
FIG. 6 shows a vertical cross section of a conventional vehicle headlamp.

Furthermore, as seen from FIGS. 2, 3 and 5, ribs 8 that extend horizontally are formed on the rear surface of the connecting portion 7. These ribs 8 enhance the rigidity of the connecting portion 7. An opening 9 that opens in the connecting portion 7 is, as seen from FIG. 1, formed in the front end portion of the lighting circuit case 2.

Nearly mesh-shaped ribs 10 are formed on an inner surface of the lighting circuit case 2. Ribs 11 that extend in nearly the fore-and-aft direction are, as seen from FIG. 5, formed on an outer side surface, that is, on a left side surface, of the lighting circuit case 2. These ribs 10 and 11 are formed in the inner and outer surfaces of the lighting circuit case 2 and give rigidity to the lighting circuit case 2. Installation bosses 12 are provided so as to protrude rearward on the rear end of the lighting circuit case 2.

A lighting circuit assembly 13 is, as shown in FIG. 1, disposed inside the lighting circuit case 2. The lighting circuit assembly 13 is comprised of a ballast circuit and a starting that are housed in a casing that is of substantially a rectangular parallelepiped. The a ballast circuit is for increasing the voltage of a battery installed in a vehicle so as to light the discharge bulb 6, and it also converts the battery voltage to a corresponding AC voltage and applies it to the discharge bulb. The starting circuit applies a high starting voltage required for the start of lighting. Furthermore, a power feeding connector 15 is connected to the lighting circuit assembly 13 by a cord 14.

After the lighting circuit assembly 13 is set inside the lighting circuit case 2, a cover 16 is attached to the lighting circuit case 2 with screws 17.

The lighting circuit assembly 13 is thus covered by the lighting circuit case 2 and the cover 16.

The lighting circuit assembly 13 is of a slightly flat rectangular parallelepiped shape. The longest side is located along nearly the fore-and-aft direction with reference to the vehicle headlamp 1 as seen from FIG. 1, and the widest surface thereof is set in substantially a vertical direction as seen from Fig. (see FIG. 5). Consequently, the load due to the supporting of the lighting circuit assembly 13 by the lighting circuit case 2 tends to be imposed on the connecting portion 7 the most. Thus, the greatest benefit is obtained from increasing the strength of the connecting portion 7.

As seen from FIG. 1, a circular opening 18 is formed in the rear portion of the lamp body 3 and at a location that opposes to the center of the reflector 5. A cylindrical portion 19 having a short axial length protrudes rearward from an opening edge of the opening 18. A cover 20 is removably attached to the rear end of the cylindrical portion 19.

The cover 20 is removed when the discharge bulb 6 is replaced or on other occasions. The replacement of the discharge bulb 6, and the attachment and removal of the power feeding connector 15 to and from a connector portion (not shown) of the discharge bulb 6 are performed through the opening 18.

When the power feeding connector 15 is attached to or removed from the connector portion of the discharge bulb 6, the power feeding connector 15 and the cord 14 that connects the power feeding connector 15 to the lighting circuit assembly 13 are pushed and pulled. In other words, the power feeding connector 15 and the cord 14 are pushed to move from the lighting circuit case 2 to the back of the reflector 5 through the opening 9 of the lighting circuit case 2 and through the inside of the connecting portion 7. Also, the power feeding connector 15 and the cord 14 are pulled to move from the back of the reflector 5 to the lighting circuit case 2 through the opening 9 of the lighting circuit case 2 and through the inside of the connecting portion 7 (see the double-dashed lines in FIG. 1).

In the above vehicle headlamp 1, the lighting circuit case 2 that houses the considerably heavy lighting circuit assembly 13 is integrally provided and connected to the lamp body 3 with the connecting portion 7 in between. Moreover, the connecting portion 7 is of a lateral U-shape and opens frontward. Therefore, the rigidity of the connecting portion 7 is high, and it is very unlikely that the connecting portion 7 is deformed by the weight of the lighting circuit assembly 13 that is housed in the lighting circuit case 2 while the vehicle headlamp is handled to be mounted on a vehicle body. When the vehicle headlamp is installed on the vehicle body, mounting bolts whose bases are buried in the installation bosses 12 that protrude at the rear end of the lighting circuit case 2, are secured to the vehicle body. Owing to the combination of the rigidity of the connecting portion 7 and the mounting bolts, the heavy lighting circuit assembly 13 is reliably retained on the side of the lamp body 3.

Since the connecting portion 7 is of nearly a lateral U-shape, the inside thereof serves as a passage, and the power feeding connector 15 and the cord 14 that connects the power feeding connector 15 to the lighting circuit assembly 13 are smoothly moved between the lighting circuit case 2 and the rear of the reflector 5 without being caught in the lamp body 3 and the reflector 5.

All the shapes and structures of the elements referred to in the above embodiment are only examples used in the implementation of the present invention. The technical scope of the present invention should not be interpreted to be limited to them.

As is obvious from the above description, the present invention is for a vehicle headlamp that includes a lamp body, a front cover that covers the front opening of the lamp body, a reflector disposed in a space defined by the lamp body and the front cover, a discharge bulb supported by the reflector, a lighting circuit assembly formed by housing a ballast circuit for lighting the discharge bulb and a starting circuit in a casing, and a power feeding connector which is connected to the lighting circuit assembly by a cord and is removably coupled to the connector portion of the discharge bulb; and in the present invention, a lighting circuit case that houses the lighting circuit assembly is integrally connected to the lamp body with a connecting portion in between and located on the side of the lamp body, and the connecting portion has a nearly lateral U-shape in vertical cross section so as to serve as a passage for the power feeding connector.

Accordingly, in the vehicle headlamp of the present invention, since the connecting portion that integrally connects the lighting circuit case to the lamp body has a lateral U-shape in vertical cross section, it has a great strength due to the shape. Even when a heavy lighting circuit assembly is housed in the lighting circuit case, its weight is sufficiently supported, and the connecting portion does not deform.

In addition, since the connecting portion has a lateral U-shape in vertical cross section, a sufficient space is secured inside, and the connecting portion can serve as a passage for the power feeding connector. When it becomes necessary to remove the lighting circuit assembly from the lamp body, the power feeding connector is not caught between the reflector and the lamp body.

In the present invention, the lighting circuit assembly is of nearly a rectangular parallelepiped shape, and the longest side of the lighting circuit assembly is disposed along nearly the fore-and-aft direction. Accordingly, the load due to supporting of the lighting circuit assembly by the lighting circuit case tends to be imposed on the connecting portion the most. Thus, the greatest benefit is obtained from the increase of the strength of the connecting portion.

What is claimed is:

1. A vehicle headlamp comprising: a lamp body, a front cover that covers a front opening of said lamp body, a reflector disposed in a space surrounded by said lamp body and said front cover, a discharge bulb supported by said reflector, a lighting circuit assembly formed by housing a ballast circuit for lighting said discharge bulb and a starting circuit in a casing, and a power feeding connector which is connected to said lighting circuit assembly by a cord and is removably coupled to a connector portion of said discharge bulb, wherein a lighting circuit case that houses said lighting circuit assembly is integrally disposed on said lamp body with a connecting portion in between, said lighting circuit case being provided on one of the left and right sides of said lamp body; and said connecting portion is in a shape of a lateral U in vertical cross-section so as to allow said power feeding connector to pass through.

2. The vehicle headlamp according to claim 1, wherein said lighting circuit assembly is of nearly a rectangular parallelepiped shape, and a longest side of said lighting circuit assembly is oriented in a fore-and-aft direction of a vehicle on which said vehicle headlamp is mounted.

* * * * *